US012800339B2

(12) United States Patent
Yu et al.

(10) Patent No.: US 12,800,339 B2
(45) Date of Patent: Nov. 17, 2026

(54) SYSTEM AND METHOD OF FEATURE MATCHING FOR ASSOCIATING VEHICLE PERCEPTION DATA

(71) Applicant: GM Global Technology Operations LLC, Detroit, MI (US)

(72) Inventors: Bo Yu, Troy, MI (US); Gui Chen, Sterling Heights, MI (US); Milan Kumar Biswal, Las Cruces, NM (US); Joon Hwang, Pflugerville, TX (US); Tarek Abdel Raouf Abdel Rahman, Madison Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 107 days.

(21) Appl. No.: 18/946,345

(22) Filed: Nov. 13, 2024

(65) Prior Publication Data

US 2026/0133048 A1 May 14, 2026

(51) Int. Cl.
*G01C 21/00* (2006.01)
*G06V 10/44* (2022.01)
(Continued)

(52) U.S. Cl.
CPC ..... *G01C 21/3822* (2020.08); *G01C 21/3859* (2020.08); *G06V 10/443* (2022.01); (Continued)

(58) Field of Classification Search
CPC ............ G01C 21/3822; G01C 21/3859; G06V 10/443; G06V 10/50; G06V 20/588; B60W 60/001; B60W 2556/40
See application file for complete search history.

(56) References Cited

U.S. PATENT DOCUMENTS 6,363,161 B2 * 3/2002 Laumeyer ............ G06V 20/582 382/104
10,706,321 B1 * 7/2020 Chen ........................ G06F 18/22
(Continued)

FOREIGN PATENT DOCUMENTS

WO 2019207160 A1 10/2019

OTHER PUBLICATIONS

Chen, G., et al. U.S. Appl. No. 18/318,247, filed May 16, 2023.
(Continued)

*Primary Examiner* — Sihar A Karwan
(74) *Attorney, Agent, or Firm* — Vivacqua Crane, PLLC

(57) ABSTRACT

A method and system of feature matching for associating vehicle perception data for crowd sourcing map data. The system is configured to execute the method including the steps of receiving perception data from a plurality of vehicles; processing the perception data to identify first feature points observed by a first vehicle and second feature points observed by a second vehicle, respectively; creating feature descriptors using multilayer bitmaps for each of the first feature points and for each of the second feature points; determining pairs of matching first and second feature points by comparing histograms of the feature descriptors; associating pairs of matching first and second feature points; updating a map database with the associated pairs of matching first and second feature points; and operating an autonomous vehicle based on the updated map database.

14 Claims, 8 Drawing Sheets

(51) Int. Cl.
*G06V 10/50* (2022.01)
*G06V 20/56* (2022.01)
*B60W 60/00* (2020.01)

(52) U.S. Cl.
CPC ............ *G06V 10/50* (2022.01); *G06V 20/588* (2022.01); *B60W 60/001* (2020.02); *B60W 2556/40* (2020.02)

(56) References Cited

U.S. PATENT DOCUMENTS

| | | | | |
|---|---|---|---|---|
| 11,287,278 | B1 * | 3/2022 | Tsoupko-Sitnikov | G01C 21/3446 |
| 11,326,889 | B2 | 5/2022 | Kim | |
| 11,578,981 | B1 * | 2/2023 | Tsoupko-Sitnikov | G01C 21/30 |
| 11,756,313 | B2 * | 9/2023 | Sarfraz | G06V 10/426 382/104 |
| 11,781,870 | B2 * | 10/2023 | Shashua | G01C 21/30 701/423 |
| 2004/0114379 | A1 * | 6/2004 | Miller | B60Q 1/085 362/465 |
| 2010/0329513 | A1 * | 12/2010 | Klefenz | G06T 7/13 348/148 |
| 2014/0324339 | A1 * | 10/2014 | Adam | G01S 13/726 701/519 |
| 2016/0102986 | A1 * | 4/2016 | Ma | G01C 21/3819 702/5 |
| 2018/0154901 | A1 * | 6/2018 | Hasberg | B60W 40/04 |
| 2019/0122386 | A1 * | 4/2019 | Wheeler | G01S 7/497 |
| 2019/0154842 | A1 * | 5/2019 | Adachi | G01C 21/36 |
| 2019/0221121 | A1 * | 7/2019 | Guo | G06V 20/56 |
| 2020/0122721 | A1 * | 4/2020 | Zhang | B60W 30/12 |
| 2020/0249332 | A1 * | 8/2020 | Pandey | G01S 7/4972 |
| 2020/0363218 | A1 * | 11/2020 | Kim | G01S 13/931 |
| 2021/0009161 | A1 * | 1/2021 | Kim | B60W 60/001 |
| 2021/0158547 | A1 * | 5/2021 | He | G01S 17/89 |
| 2021/0206389 | A1 * | 7/2021 | Kim | G01C 21/3885 |
| 2021/0323469 | A1 * | 10/2021 | Lee | B60Q 1/346 |
| 2022/0019810 | A1 * | 1/2022 | Farber | G06V 20/52 |
| 2022/0187841 | A1 * | 6/2022 | Ebrahimi Afrouzi | G01C 21/12 |
| 2022/0269891 | A1 * | 8/2022 | Kaku | G06F 18/21 |
| 2022/0306156 | A1 * | 9/2022 | Wray | G06V 20/588 |
| 2022/0315000 | A1 * | 10/2022 | Wray | B60W 30/18163 |
| 2023/0060542 | A1 * | 3/2023 | Friedrich | G01C 21/3819 |
| 2023/0091064 | A1 * | 3/2023 | Shuman | H04W 4/46 370/310 |
| 2023/0296394 | A1 * | 9/2023 | Lee | G01C 21/3682 701/436 |
| 2023/0303111 | A1 * | 9/2023 | Stenneth | G01C 21/3889 |
| 2024/0037961 | A1 * | 2/2024 | Kaku | G06T 7/11 |
| 2024/0068836 | A1 * | 2/2024 | Yu | G01C 21/3815 |
| 2024/0085210 | A1 * | 3/2024 | Yu | G01C 21/3822 |
| 2024/0202965 | A1 * | 6/2024 | Balasubramanian | G06T 7/73 |
| 2024/0280376 | A1 * | 8/2024 | Chen | G06T 7/0002 |

OTHER PUBLICATIONS

Yu, B., et al. U.S. Appl. No. 18/359,017, filed Jul. 26, 2023.
Yu, B., et al. U.S. Appl. No. 18/530,686, filed Dec. 6, 2023.
Song, H., et al. "A Lightweight High Definition Mapping Method Based on Multi-Source Data Fusion Perception," Applied Sciences, 2023, vol. 13, pp. 1-17.
United States Patent and Trademark Office. U.S. Appl. No. 18/318,247, filed May 16, 2023.
United States Patent and Trademark Office. U.S. Appl. No. 18/359,017, filed Jul. 26, 2023.
United States Patent and Trademark Office. U.S. Appl. No. 18/530,686, filed Dec. 6, 2023.

* cited by examiner

| | | | | | | | | | | |
|---|---|---|---|---|---|---|---|---|---|---|
| Y | 0 | 0 | 0 | 12 | 23 | 15 | 0 | 0 | 0 | 0 |
| W | 0 | 0 | 0 | 0 | 0 | 0 | 0 | 12 | 45 | 12 |
| D | 0 | 0 | 0 | 12 | 35 | 15 | 0 | 0 | 0 | 0 |

X

SYSTEM AND METHOD OF FEATURE MATCHING FOR ASSOCIATING VEHICLE PERCEPTION DATA

INTRODUCTION

The present disclosure generally relates to autonomous vehicles having perception systems, and more particularly to a system and method of feature matching for associating vehicle perception data gathered by the perception system.

Modern vehicles capable of partial or full driving automation are generally referred to as autonomous vehicles. Such autonomous vehicles have intelligent systems, also referred to as smart systems, such as Advanced Driver Assistance Systems (ADAS) and/or Automated Driving Systems (ADS) that reside onboard the vehicles and are used to enhance or automate functions of various vehicle systems.

Smart systems have one or more control modules that are configured to receive and process information gathered by the vehicle external sensors. The vehicle external sensors include, but are not limited to, cameras, radar, and LiDAR, which may be mounted on the exterior of the vehicle or in an interior compartment of the vehicle and are configured to gather information on the exterior surrounding environment of the vehicle. The gathered information is also referred to as perception data. The one or more control modules process the perception data to detect and identify objects around the vehicle, including, but are not limited to, surrounding vehicles, pedestrians, road configurations, traffic signs, landmarks, and road markings.

The detected and identified objects are used by the smart system for partial or full automation of the vehicle. Since perception data collected from a single smart system equipped vehicle is subject to sensor errors, perception data gathered by a plurality of smart system equipped vehicles for a section of a roadway or area may be pooled and processed for greater accuracy. Thus, while current smart systems achieve their intended purpose, there is a need for a new and improved system and method of feature matching for associating perception data gathered by a plurality of vehicles to improve accuracy.

SUMMARY

According to several aspects, a method of feature matching for associating vehicle perception data is provided. The method includes receiving perception data from a plurality of vehicles, wherein the plurality of vehicles includes a first vehicle and a second vehicle; processing the perception data to identify first feature points observed by the first vehicle and second feature points observed by the second vehicle, respectively; creating feature descriptors for each of the first feature points and for each of the second feature points; comparing the feature descriptors for each of the first feature points and for each of the second feature points to determine pairs of matching first feature points and second feature points; associating the pairs of matching first feature points and second feature points; updating a map database with the associated pairs of matching first feature points and second feature points; and operating an autonomous vehicle based on the updated map database.

In an additional aspect of the present disclosure, creating feature descriptors for each of the first feature points and for each of the second feature points, includes plotting the first feature points on a first bitmap and creating a first feature descriptor for each of the first feature points; and plotting the second feature points on a second bitmap and creating a second feature descriptor for each of the second feature points.

In another aspect of the present disclosure, comparing the feature descriptors for each of the first feature points and for each of the second feature points to determine pairs of matching first feature points and second feature points, further includes applying a first spatial histogram on at least one of the first feature descriptors and a second spatial histogram at least one of second feature descriptors proximal to the at least one of the first feature descriptors; determining matching first feature descriptors and second feature descriptors based on a predetermined feature distance threshold between the spatial histogram and the second histogram; and determining pairs of matching first feature points and second feature points based on a matching first descriptor and second feature descriptor.

In another aspect of the present disclosure, at least one of the first bitmap and the second bitmap is a multi-layer bitmap. Each layer includes a different attribute of a feature point.

In another aspect of the present disclosure, determining pairs of matching first feature points and second feature points further includes identifying neighboring first feature points and second feature points; determining non-matching first feature descriptors and second feature descriptors based on mutual exclusive attributes between the first spatial histogram and the second histogram; and filtering out non-matching first feature descriptors.

In an additional aspect of the present disclosure, filtering out non-matching first feature descriptors is performed before determining pairs of matching first feature points and second feature points based on the matching first descriptor and second feature descriptor.

In another aspect of the present disclosure, the method further includes determining outlier pairs of matching first feature point and second feature points; and filtering out the outlier pairs before associating the pairs of matching first feature points and second feature points.

In another aspect of the present disclosure, determining outlier pairs of matching first feature point and second feature points includes: identifying a first observation region and a second observation region; randomly selecting a first pair of matching feature points in the first observation region and a second pair of matching feature points in the second observation region, wherein the first pair of matching feature points includes feature points $P_{1,1}$, $P_{2,1}$ and the second pair of matching feature points includes feature points $P_{1,2}$, $P_{2,2}$; determining a translated vector by translating $P_{2,1}$ to overlap $P_{1,1}$ and fix overlapping feature points $P_{1,1}$, $P_{2,1}$; determining a rotated angle by rotating feature points $P_{2,2}$ to overlap $P_{1,2}$ while pivoting on the fixed overlapping feature points $P_{1,1}$, $P_{2,1}$; and applying the translated vector and the rotated angle to the remaining pairs of matching feature points.

In another aspect of the present disclosure, the method further includes determining a solution score based on the number of feature pair inliers and GPS variance from translation and rotation.

In another aspect of the present disclosure, the method is performed a controller located in one of: a smart vehicle and a cloud based server.

According to several aspects, a system for feature matching to associate vehicle perception data is provided. The system includes a server communication system configured to receive perception data from a plurality of vehicles; a map database; a server controller in electrical communication with the server communication system and the map database. The server controller is configured to: receive perception data from a plurality of vehicles, wherein the plurality of vehicles includes a first vehicle and a second vehicle; process the perception data to identify first feature points observed by the first vehicle and second feature points observed by the second vehicle, respectively; create feature descriptors for each of the first feature points and for each of the second feature points; determine pairs of matching first feature points and second feature points includes comparing the feature descriptors for each of the first feature points and for each of the second feature points; associate the pairs of matching first feature points and second feature points; update a map database with the associated pairs of matching first feature points and second feature points; and communicate the updated map database to at least one of the plurality of vehicles for operation based on the updated map database.

In an additional aspect of the present disclosure, create feature descriptors for each of the first feature points and for each of the second feature points, includes: plotting the first feature points on a first bitmap and create a first feature descriptor for each of the first feature points and plotting the second feature points on a second bitmap and create a second feature descriptor for each of the second feature points. The at least one of the first bitmap and the second bitmap is a multi-layer bitmap, and wherein each layer includes a different attribute of a feature point.

In another aspect of the present disclosure, determine pairs of matching first feature points and second feature points, further includes:

applying a first spatial histogram on at least one of the first feature descriptors and a second spatial histogram at least one of second feature descriptors proximal to the at least one of the first feature descriptors, determining matching pairs of first feature descriptors and second feature descriptors based on a feature distance threshold between the first spatial histogram and the second spatial histogram, and determining matching pairs of first feature points and second feature points based on a matching first descriptor and second feature descriptor.

In another aspect of the present disclosure, determine pairs of matching first feature points and second feature points further includes identifying neighboring first feature points and second feature points; determining non-matching first feature descriptors and second feature descriptors based on mutual exclusive attributes between the first spatial histogram and the second histogram; and filtering out non-matching first feature descriptors.

In another aspect of the present disclosure, the server controller is further configured to determine outlier pairs of matching first feature point and second feature points; and filter out the outlier pairs before associating the pairs of matching first feature points and second feature points.

In an additional aspect of the present disclosure, determine outlier pairs of matching first feature point and second feature points includes: identifying a first observation region and a second observation region; selecting a first pair of matching feature points in the first observation region and a second pair of matching feature points in the second observation region, wherein the first pair of matching feature points includes feature points $P_{1.1}$, $P_{2,1}$ and the second pair of matching feature points includes feature points $P_{1,2}$, $P_{2,2}$; determining a translated vector by translating $P_{2,1}$ to overlap $P_{1.1}$ and fix the overlapping feature points $P_{1,1}$, $P_{2,1}$; determining a rotated angle by rotating feature points $P_{2,2}$ to overlap $P_{1,2}$ while pivoting on the fixed overlapping feature points $P_{1,1}$, $P_{2,1}$; and applying the translated vector and the rotated angle to the remaining pairs of matching feature points.

In another aspect of the present disclosure, the server controller is further configured to determine a solution score based on the number of feature pair inliers and GPS variance from translation and rotation.

According to several aspects, a system comprising a processor and a non-transitory computer readable medium having instructions stored thereon for feature matching to associate vehicle perception data, that upon execution by the processor, cause the processor to receive perception data on a portion of a vehicle path gathered by a plurality of vehicles; create feature points for each of the plurality of vehicles by processing the data gathered by each of the plurality of vehicles, respectively; create a feature descriptor for each of the feature points for each of the plurality of vehicles using multi-layer bitmap data structures; create lane line point associations by matching common feature descriptors and filtering outliers; update map data with lane point associations; communicate updated map data to at least one of plurality of vehicles.

In an additional aspect of the present disclosure, create feature descriptors for each of the feature points, includes plot a plurality of first feature points on a first bitmap and create a first feature descriptor for each of the first feature points, and plot a plurality of second feature points on a second bitmap and create a second feature descriptor for each of the second feature points.

In another aspect of the present disclosure, the instructions further causes the processor to compare a first spatial histogram on at least one of the first feature descriptors and a second spatial histogram on at least one of second feature descriptors, determine matching first feature descriptors and second feature descriptors based on a feature distance threshold between the first spatial histogram and the second histogram, and determine matching first feature points and second feature points based on a matching first descriptor and second feature descriptor.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way

DETAILED DESCRIPTION

Figure 1:
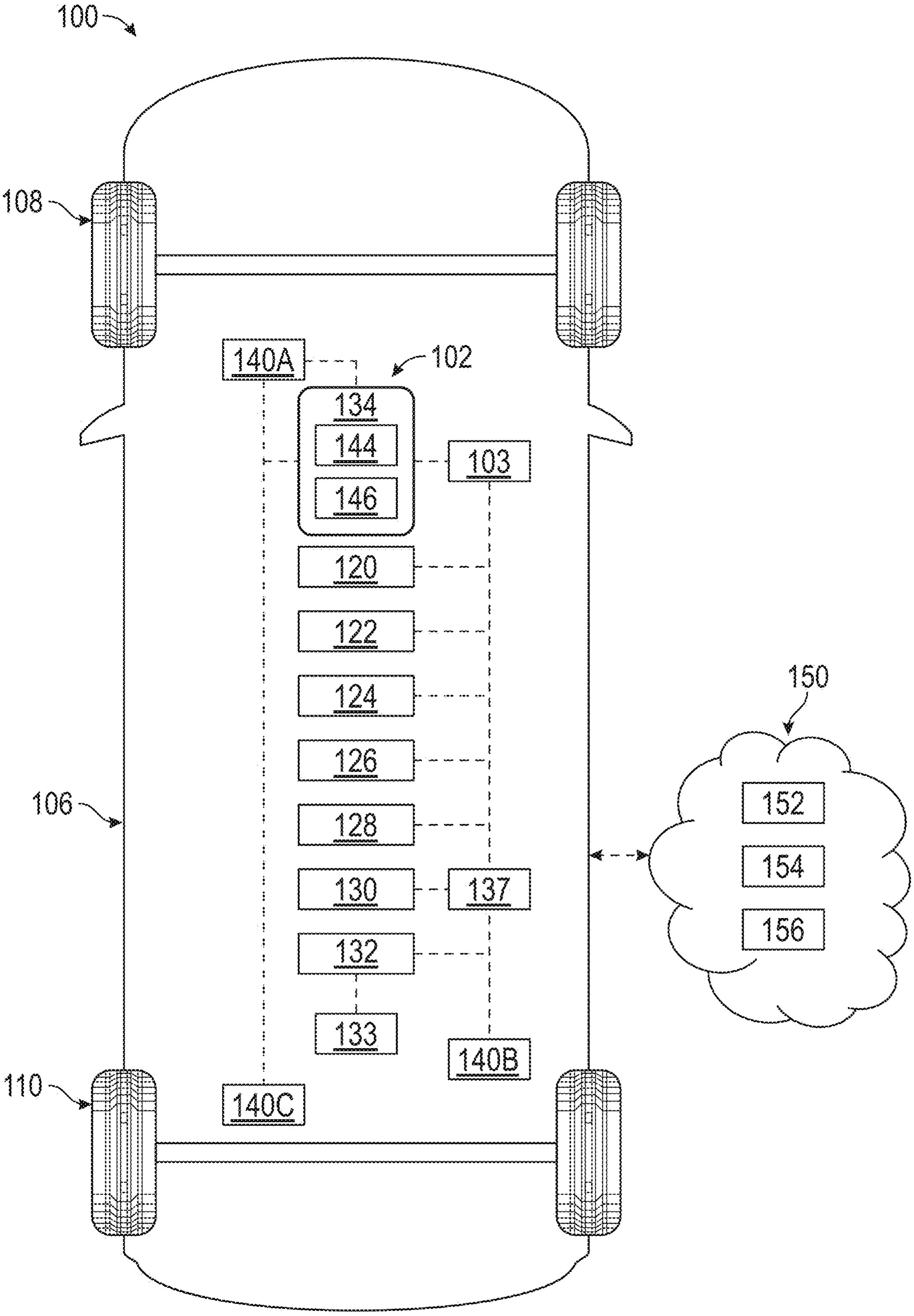
FIG. 1 is functional diagram of a vehicle having a smart system, according to an exemplary embodiment.

The following description is merely exemplary in nature and is not intended to limit the present disclosure, application, or uses. The illustrated embodiments are disclosed with reference to the drawings, wherein like numerals indicate corresponding parts throughout the several drawings. The figures are not necessarily to scale and some features may be exaggerated or minimized to show details of particular features. The specific structural and functional details disclosed are not intended to be interpreted as limiting, but as a representative basis for teaching one skilled in the art as to how to practice the disclosed concepts.

As used herein, the terms module, component module, control module, or controller refer to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may conduct a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

The connecting lines shown in the various figures contained herein are intended to represent example functional relationships and/or physical couplings between the various elements. Conventional techniques may be used for signal processing, data transmission, signaling, control, and other functional aspects of the systems (and the individual operating components of the systems) may not be described in detail herein. It should be noted that many alternative or additional functional relationships or physical connections may be present in an embodiment of the present disclosure.

Although the terms first, second, third, etc. may be used herein to describe various elements, components, portions, and/or sections, these elements, components, portions, and/or sections should not be limited by these terms, unless otherwise indicated. These terms are used to distinguish one elements, components, portions, and/or sections from another elements, components, portions, and/or sections.

In crowd-sourced map construction, perception data gathered by a plurality of smart vehicles for a section of roadway or area are processed to detect and identify objects, which includes lane lines, stop signs, etc. The location of the objects and identification of the objects are updated in a crowd-sourced map data. The updated crowd-sourced map data are communicated to smart vehicles for improved vehicle operations as the smart vehicles travel through the section of roadway or area. The crowd-sourced perception data may have slight discrepancies in the location of the detected objects caused by variables such as external sensor capabilities, positions of the smart vehicle on the roadway, and accuracy of GPS. Therefore, a common step in crowd-sourced map construction is to associate the perception data gathered by one vehicle with perception data gathered by another vehicle. The following disclosure provides a system and method of feature matching for associating crowd sourced perception data.

FIG. 1 is a functional diagram of a vehicle 100 having a smart system 102, such as an Advance Driver Assistance System (ADAS) and/or an Automated Driving System (ADS), capable of operating from Level 0 (no driving automation) to Level 5 (full driving automation) in accordance with SAE J3016 levels of driving automation. The vehicle 100 is also referred to as an autonomous vehicle 100 or a smart vehicle 100. The vehicle 100 generally includes a body 106, front wheels 108, and rear wheels 110. The body 106 substantially encloses the vehicle systems and components of the vehicle 100. The front wheels 108 and the rear wheels 110 are each rotationally coupled to the body 106 near the respective corner of the body 106. Although the connected vehicle 100 is shown as a sedan, it is envisioned that that connected vehicle 100 may be another type of on-road vehicle, such as a pickup truck, a coupe, a sport utility vehicle (SUVs), a recreational vehicle (RVs), and a motorcycle.

As shown, the vehicle 100 generally includes a smart system 102 such as ADAS and/or ADS, a propulsion system 120, a transmission system 122, a steering system 124, a brake system 126, a perception system 128, a vehicle communication system 130, and a global navigation satellite system (GNSS) 132. The vehicle systems 120, 122, 124, 126, 128, 130 and 132 are in communication with a control module 134 of the smart system 102. The vehicle 100 may also include various vehicle actuators 133 in communications with the control module 134 and with selected vehicle systems 120, 122, 124, 126, 128, 130 and 132. The various vehicle actuators 133 are configured to selectively operate components of the vehicle systems 120, 122, 124, 126, 128, 130, 132 based on commands from the control module 134.

The smart system 102 includes the vehicle control module 134 in communication with one or more vehicle systems 120, 122, 124, 126, 128, 130, 132 and vehicle actuators 133 using a Controller Area Network (CAN) and/or ethernet 137. The vehicle control module 134 may be configured to implement a Method of feature matching for associating vehicle perception data (Method 400), as described in detail below. The Method 400 can be implemented on a vehicle control module 134 on an individual vehicle 100 to process perception data gathered from multiple passes on a same section of roadway by the individual vehicle 100. The Method 400 can also be implemented on a cloud server 150 to process perception data on a section of roadway gathered by a plurality of vehicles 100.

The control module 134 includes at least one processor 144 and a non-transitory computer readable storage device or media 146. The non-transitory computer readable storage device or media 146 includes machine-readable instructions that when executed by the processor 144, causes the processors 144 to execute the Method 400 described below and to operate the vehicle 100 in partial or full autonomous mode. The processor 144 may be a custom made or commercially available processor, a central processing unit (CPU), a graphics processing unit (GPU), an auxiliary processor among several processors associated with the control module 134, a semiconductor-based microprocessor (in the form of a microchip or chip set), a macro processor, a combination thereof, or generally a device for executing instructions. The vehicle computer readable storage device or media 146 may include volatile and nonvolatile storage in read-only memory (ROM), random-access memory (RAM), and keep-alive memory (KAM), for example. KAM is a persistent or non-volatile memory that may be used to store various operating variables while the processor 144 is powered down. The vehicle computer-readable storage device or media 146 of the control module 134 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the control module 134 in controlling the smart vehicle 100.

The perception system 128 is configured to gather information, perception data, on the external environment surrounding the vehicle 100. In a non-limiting exemplary embodiment, the perception system 128 may include one or more cameras 140A, 140B, 140C arranged to capture images and/or videos of the environment adjacent to all sides of the vehicle 100. The one or more cameras 140A, 140B, 140C may include a front-facing camera 140A, a rear-facing camera 140B, and/or at least one side-facing camera 140C. The one or more cameras 140A, 140B, 140C may have various image sensors including, for example, charge-coupled device (CCD) sensors, complementary metal oxide semiconductor (CMOS) sensors, and/or high dynamic range (HDR) sensors. The one or more cameras 140A, 140B, 140C may have various lens types including, for example, wide-angle lenses and/or narrow-angle lenses are also within the scope of the present disclosure.

The GNSS 132 is configured to determine a geographical location of the vehicle 100. In an exemplary embodiment, the GNSS 132 is a global positioning system (GPS). In a non-limiting example, the GPS includes a GPS receiver antenna (not shown) and a GPS controller (not shown) in electrical communication with the GPS receiver antenna. The GPS receiver antenna receives signals from a plurality of satellites, and the GPS controller calculates the geographical location of the vehicle 100 based on the signals received by the GPS receiver antenna. In an exemplary embodiment, the GPS additionally includes a map. The map contains information about infrastructure such as municipality borders, roadways, railways, sidewalks, buildings, and the like. Therefore, the geographical location of the vehicle 100 is contextualized using the map information.

The vehicle communication system 130 is used by the vehicle control module 134 to communicate with other systems external to the vehicle 100. For example, the vehicle communication system 130 includes capabilities for communication with vehicles ("V2V" communication), infrastructure ("V2I" communication), remote systems at a remote call center and/or personal devices. In general, the term vehicle-to-everything communication ("V2X" communication) refers to communication between the vehicle 100 and any remote system (e.g., vehicles, infrastructure, and/or remote systems). In certain embodiments, the vehicle communication system 130 is a wireless communication system configured to communicate via a wireless local area network (WLAN) using IEEE 802.11 standards or by using cellular data communication (e.g., using GSMA standards, such as, for example, SGP.02, SGP.22, SGP.32, and the like). Accordingly, the vehicle communication system 130 may further include an embedded universal integrated circuit card (eUICC) configured to store at least one cellular connectivity configuration profile, for example, an embedded subscriber identity module (eSIM) profile.

The vehicle communication system 130 is further configured to communicate via a personal area network (e.g., BLUETOOTH) and/or near-field communication (NFC). However, additional, or alternate communication methods, such as a dedicated short-range communications (DSRC) channel and/or mobile telecommunications protocols based on the 3rd Generation Partnership Project (3GPP) standards, are also considered within the scope of the present disclosure. DSRC channels refer to one-way or two-way short-range to medium-range wireless communication channels specifically designed for automotive use and a corresponding set of protocols and standards. The 3GPP refers to a partnership between several standards organizations which develop protocols and standards for mobile telecommunications. 3GPP standards are structured as "releases". Thus, communication methods based on 3GPP release 14, 15, 16 and/or future 3GPP releases are considered within the scope of the present disclosure. Accordingly, the vehicle communication system 130 may include one or more antennas and/or communication transceivers for receiving and/or transmitting signals, such as cooperative sensing messages (CSMs). The vehicle communication system 130 is configured to wirelessly communicate information between the vehicle 100 and another vehicle. Further, the vehicle communication system 130 is configured to wirelessly communicate information between the vehicle 100 and infrastructure or other vehicles. It should be understood that the vehicle communication system 130 may be integrated with the vehicle control module 134 (e.g., on a same circuit board with the vehicle control module 134 or otherwise a part of the vehicle control module 134) without departing from the scope of the present disclosure.

With continued reference to FIG. 1, the cloud server system 150 includes a server controller 152 in electrical communication with a map database 154 and a server communication system 156. In a non-limiting example, the cloud server system 150 is located in a server farm, datacenter, or the like, and connected to the internet using the server communication system. The server controller 152 includes at least one server processor and a server non-transitory computer readable storage device or server media. The description of the type and configuration given above for the vehicle control module 134 also applies to the server controller. In some examples, the server controller 152 may differ from the vehicle control module 134 in that the server controller 152 is capable of a higher processing speed, includes more memory, includes more inputs/outputs, and/or the like. In a non-limiting example, the server processor and server media of the server controller 152 are similar in structure and/or function to the processor and the media of the vehicle control module, as described above.

The map database 154 is used to store map data about roadways, including, for example, lane line map data, as will be discussed in greater detail below. The server communication system 156 is used to communicate with external systems, such as, for example, the vehicle control module 134, via the vehicle communication system 130. In a non-limiting example, the server communication system 156 is similar in structure and/or function to the vehicle communication system 130 of the vehicle system, as described above.

Figure 2:
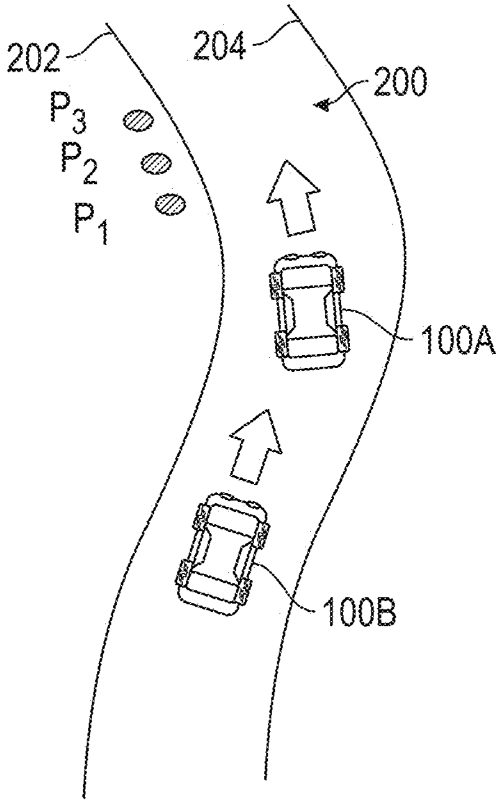
FIG. 2 is an illustration of a plan view of a plurality of vehicles having smart systems traveling on a roadway, according an exemplary embodiment.

FIG. 2 is an illustration of a non-limiting example of a scenario in which a first smart vehicle 100A and a second smart vehicle 100B are traveling on a section of a roadway 200 defined between a first lane marker 202 and a second lane marker 204. For brevity, the first smart vehicle 100A and the second smart vehicle 100B are referred to as the first vehicle 100A and the second vehicle 100B, respectively. Each of the first and second vehicles' location trajectory is determined by using the GNSS on the respective vehicles 100A, 100B. In one example, the perception system 128 of the respective vehicles 100A, 100B captures a plurality of images of the roadway 200 and areas adjacent the roadway 200 including any landmarks. The control module 134 of the respective vehicles 100A, 100B utilizes a computer vision algorithm to identify feature points $P_1$, $P_2$, $P_3$ in the plurality of images of the roadway. The feature points $P_1$, $P_2$, $P_3$ may represent land markings, landmarks, traffic signs, road configuration and any other items typically found on a roadway. The communication system 130 of each vehicle 100A, 100B is configured to upload the respective perception data, the vehicle global location, and a time stamp is gathered to the cloud server system 150.

Figure 3:
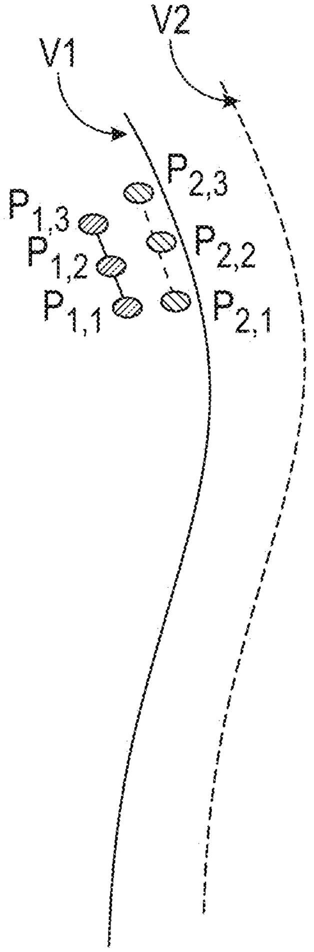
FIG. 3 is an illustration of the perception data gathered by the plurality of vehicles of FIG. 2, according to an exemplary embodiment.

FIG. 3 is an illustration of the perception data gathered by each of the vehicles. The trajectory of the first vehicle 100A as determined by the GNSS 132 of the first vehicle 100A is indicated by reference numeral V1 (trajectory V1). The trajectory of the second vehicle 100B as determined by the GNSS 132 of the second vehicle 100B is indicated by reference numeral V2 (trajectory V2). The locations of the feature points $P_1$, $P_2$, $P_3$ as observed by the first vehicle 100A is indicated by reference numerals $P_{1,1}$, $P_{1,2}$, $P_{1,3}$, respectively. The locations of the feature points $P_1$, $P_2$, $P_3$ as observed by the second vehicle 100B is indicated by reference numerals $P_{2,1}$, $P_{2,2}$, $P_{2,3}$, respectively.

The offset of the feature points $P_1$, $P_2$, $P_3$, as perceived by the first vehicle 100A and second vehicle 100B is due, in part, to one or more of GNSS inaccuracy, sensor limitations, weather, obstructions, the relative locations of the vehicles 100A, 100B while gathering perception data, and other contributing factors. The collected perception data collected by the first vehicle 100A and the second vehicle 100B are uploaded to the cloud server system 150. The cloud server system 150 is configured to associate and align the perception data gathered by a plurality of vehicles to improve the accuracy of a map database. The map database may be downloaded to smart vehicles to enhance and/or automate various vehicle functions.

Figure 4:
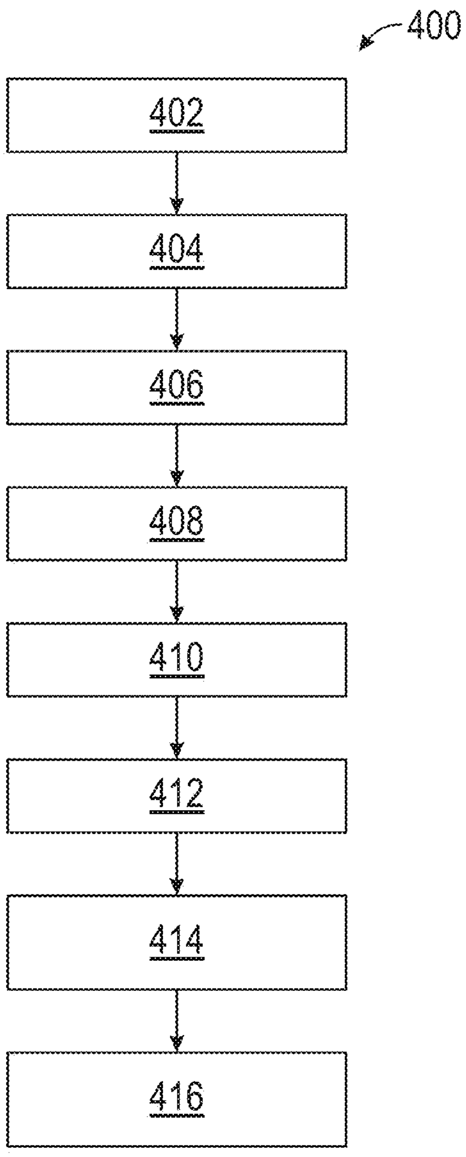
FIG. 4 is a block flow diagram of a method of feature matching for associating vehicle perception data, according to an exemplary embodiment.

FIG. 4 is a block flow diagram of a method of feature matching for associating vehicle perception data in order to align and reconcile the perception data collected by a plurality of vehicles (Method 400). The Method 400 utilizes computer vision features to align two sematic maps or to align two smart vehicles' sematic perception data. Semantic maps means a map or map data generated by processing sematic perception data. Semantic perception data means data gathered by vehicle sensors on one or more vehicles. The Method 400 includes using computer vision features to represent landmarks (lane lines, road signs, etc.) as feature points, defining feature point descriptors, leveraging spatial histograms to represent the spatial relation among proximal feature points (also referred to as neighboring feature points), implementing a matching algorithm to align feature points in perception data collected by multiple smart vehicles, and utilizes a random sample consensus (RANSAC) algorithm to eliminate outliers in matched feature point pairs.

At Block 402, a plurality of smart vehicles gather perception data on a portion of a roadway and/or area. The perception data, together with a time stamp of the data and vehicle trajectory, is communicated to a cloud server system 150. The Method 400 proceeds to Block 404.

At Block 404, feature points are created. The perception data is processed by the cloud server system 150 to create feature point representing the observation of each the vehicles 100A, 100B. Feature points may represent landmarks, road signs, traffic signals, and other distinguishing features. Observed lane lines may be converted into feature points. In a non-limiting example, in a semantic map or on a vehicle's perception data set, a lane line may be represented by a polynomial, $y=ax^2+bx+c$, in a smart vehicle's ego coordinate system. For each lane line, the polynomial representation is converted to feature points: $(x_1, y(x_1))$, $(x_2, y(x_2))$, $(x_3, y(x_3))$. It should be understood that any method for determining a mathematical equation describing one or more lane lines is within the scope of the present disclosure.

In another exemplary embodiment, to determine a lane line map, the server controller 152 may use a hill climbing algorithm, as described in U.S. application Ser. No. 17/930,503, titled "HILL CLIMBING ALGORITHM FOR CONSTRUCTING A LANE LINE MAP", filed on Sep. 8, 2022, the entire contents of which is hereby incorporated by reference. It should be understood that any method for determining a mathematical equation describing one or more lane lines is within the scope of the present disclosure. The Method 400 proceeds to Block 406.

At Block 406, feature descriptors are created. Multi-layer bitmaps may be used to create feature descriptors for each of the feature points. The feature descriptors created may include several pieces of information, such as: 1) the attributes of the lane lines (color, type, position, etc.); and 2) the relative positioning with neighboring landmarks (lane lines).

Figure 5:
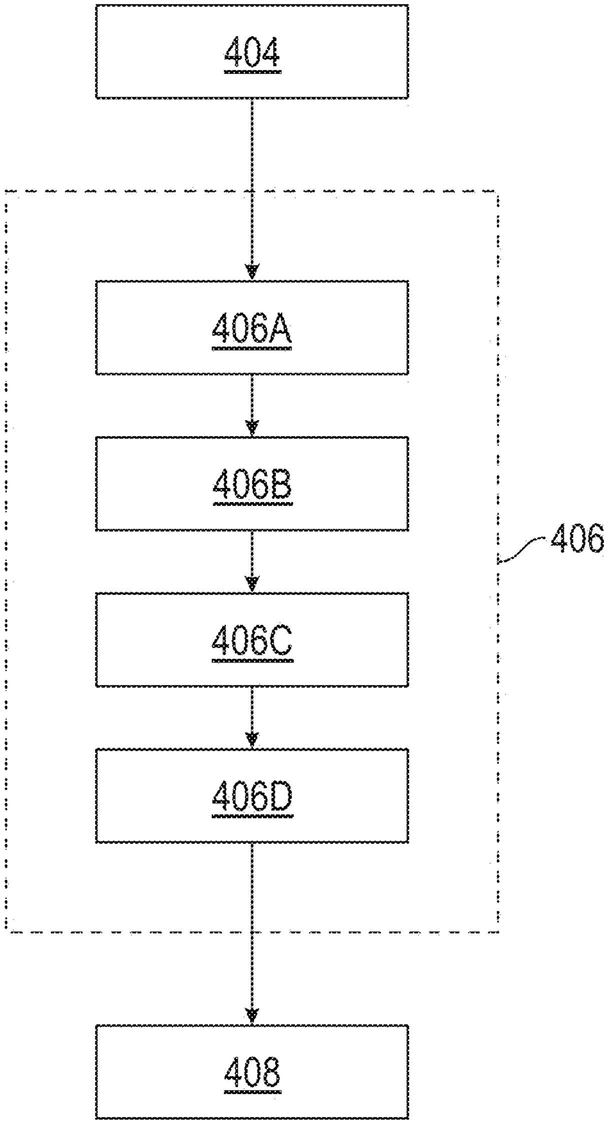
FIG. 5 is a detailed flow diagram of a block of FIG. 4, according to an exemplary embodiment.
Figures 6A, 6B:
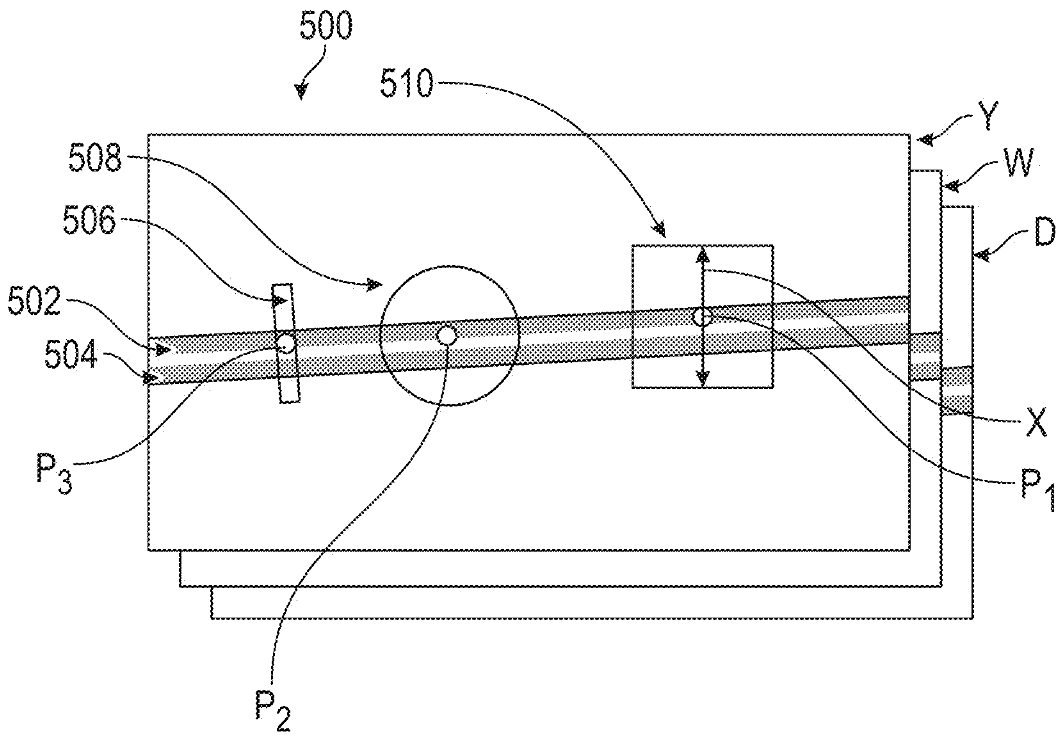
FIG. 6A is an illustration of a multi-layer bitmap, according to an exemplary embodiment.
FIG. 6B is a spatial histogram showing an intensity of pixels along a segment within the multi-layer bitmap of FIG. 6A, according to an exemplary embodiment.

FIG. 5 is a detailed block flow diagram of Block 406. FIG. 6A is an illustration of a multi-layer bitmap 500 (also referred to as bitmap 500) used as an exemplary illustration for describing the detailed block flow diagram of Block 406. Referring to both FIG. 5 and FIG. 6, a first lane line 502 and a second lane 504, as observed by a smart vehicle, are plotted onto a multi-layer bit map. Each layer of the bitmap 500 represents certain attributes of the lane lines 502, 504 such as color, type, position, etc. In a non-limiting example, each of the layers Y, W, D of the bitmap 500 represents certain attributes of the lane lines 502, 504. For example, layer Y represents a yellow lane line, layer W represents a white lane line, and layer D represents a dashed lane line. The Method 400 proceeds to Block 406B.

At Block 406B, a Kernel Density Estimation (KDE) or a Gaussian filter to eliminate noise may be applied to indicate the uncertainty of the lane line positions to remove noise. The Method 400 proceeds to Block 406C.

At Block 406C, a plurality of pixels contained within a predetermined boundary shape surrounding each of the feature points $P_1$, $P_2$, $P_3$ are selected as a feature descriptor. In other words, a feature descriptor is defined by all the pixels contained within a predetermined boundary shape. In a non-limiting example, the predetermined boundary shapes may be a rectangle 506, a circle 508, a square 510, or even a line of pixels. A line of pixels can help reduce computing overhead. The predetermined boundary shape should be big enough to reach adjacent landmarks, also referred to as neighboring landmarks. In a non-limiting example, the predetermined boundary shape includes a lateral distance of 5 to 8 meters. The Method 400 proceeds to Block 406D.

At Block 406D, a spatial histogram is applied to the selected pixels to further reduce the data size of a feature descriptor. FIG. 6B is an exemplary spatial histogram showing an intensity of the pixels along the lateral distance X within the boundary shape 510. The horizontal axis represents the lateral distance X and the vertical axis represents the intensity of the pixel, with a higher number is equal to a greater intensity. A first spatial histogram of a first feature descriptor of a first feature point observed by a first smart vehicle may be compared with a second spatial histogram of a second feature descriptor of a second feature point observed by second smart vehicle to determine whether the first feature point match with the second feature point. In other words, the spatial histogram is used determine whether the first feature point observed by the first vehicle is the same as the second feature point observed by the second vehicle.

A feature distance may be determined between two feature points within a feature descriptor. A feature distance is an objective score that summarizes the relative difference between two objects, feature points, in a problem domain. An example of determining a feature distance is utilizing the formula:

$$\text{feature\_distance}(f_1, f_2) = \sum_{p_i \in f_1, p_j \in f_2} (p_i \cdot p_j)$$

The higher the number, the higher the probability that two separately observed feature points are the same feature point. Other feature distance metrics can also be used, such as, Euclidean distance, cosine similarity, Mahalanobis distance, etc. The Method 400 proceeds to Block 408.

Figure 7A:
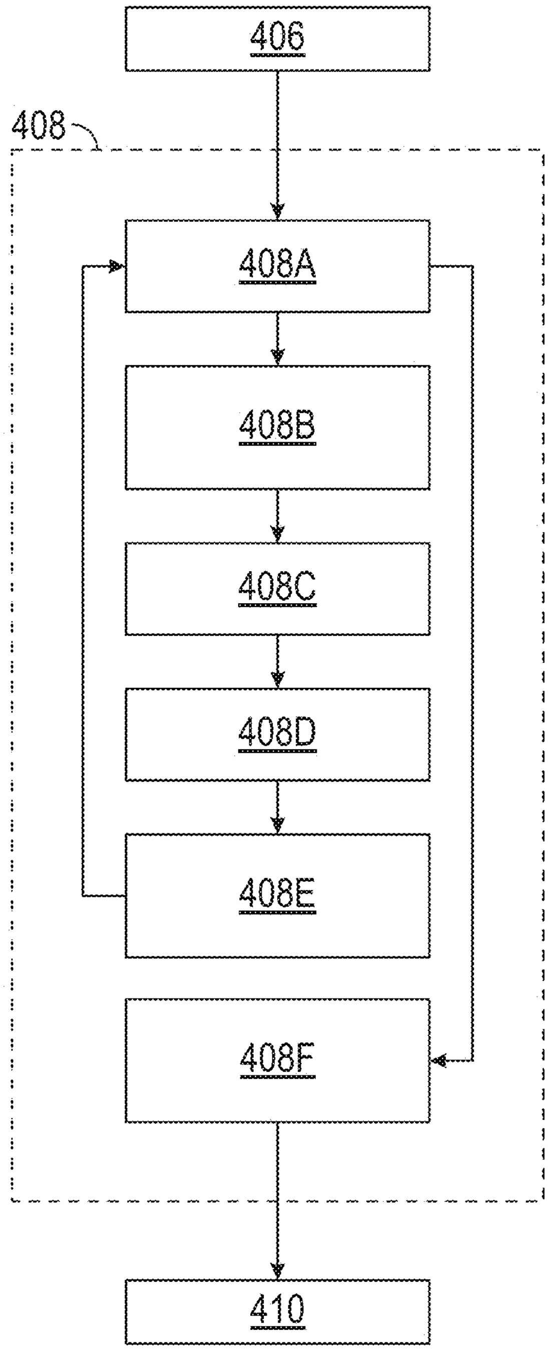
FIG. 7A is a detailed block flow diagram of another block of FIG. 4, according to an exemplary embodiment.

At Block 408 a feature matching algorithm is implemented. The feature matching algorithm finds matches between the first vehicle perception landmarks (feature points) and the second vehicle perception landmarks (feature points). FIG. 7A is a detailed block flow diagram of Block 408.

Figure 7B:
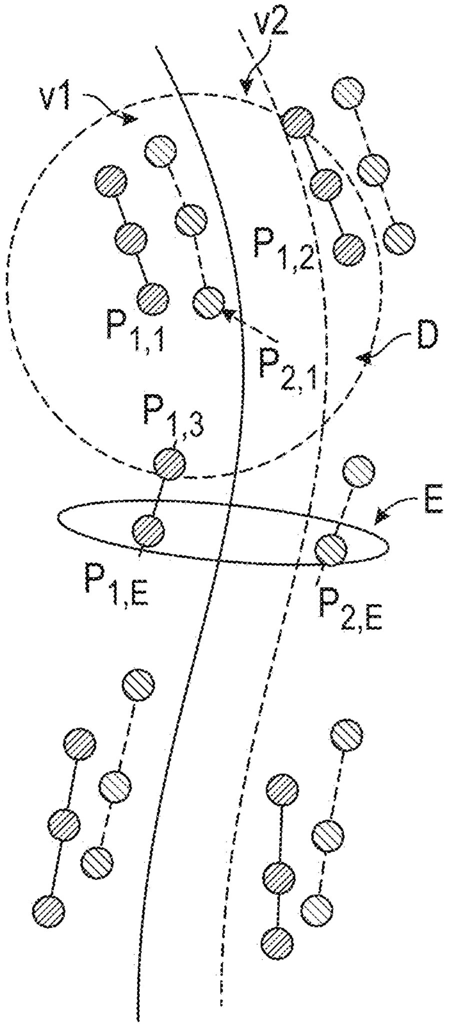
FIG. 7B is an illustration of perception data gathered by a first vehicle and a second vehicles, according to an exemplary embodiment.

FIG. 7B is an illustration of the perception data gathered by each of the vehicles 100A, 100B used as an exemplary illustration for describing the detailed block flow diagram of Block 408. The trajectory V1 of the first vehicle 100A is determined by the GNSS 132 of the first vehicle 100A. The trajectory V2 of the second vehicle 100B is determined by the GNSS 132 of the second vehicle. Feature points within boundary D as observed by the first vehicle 100A is indicated by reference numerals $P_{1,1}$, $P_{1,2}$, $P_{1,3}$, and the feature point as observed by the second vehicle 100B is indicated by reference numerals $P_{2,1}$. The feature point within boundary E as observed by the first vehicle is indicated by reference numeral $P_{1,E}$, and the feature point as observed by the second vehicle is indicated by reference numerals $P_{2,E}$.

Referring to both FIGS. 7A and 7B, at Block 408A, feature points observed from each of a plurality of smart vehicles 100A, 100B are identified. FIG. 7B, certain feature points $P_{1,1}$, $P_{1,2}$, $P_{1,3}$, $P_{1,E}$, and trajectory V1 of the first vehicle and the certain feature points $P_{2,1}$, $P_{2,E}$ and trajectory V2 of the first vehicle are illustrated. The Method 400 proceeds to Block 408B.

At Block 408B, for each identified feature point from one vehicle's perception data, the neighboring feature points from the other vehicle is found or determined. For example, the feature point $P_{2,1}$ is observed by second vehicle 100B. Feature point $P_{2,1}$. has multiple neighboring feature points $P_{1,1}$, $P_{1,2}$, $P_{1,3}$ as observed by the first vehicle 100A. Neighboring feature points may be defined as adjacent feature points (landmarks) within a predetermined boundary region D. The Method 400 proceeds to Block 408C.

At Block 408C, proximal feature points, also referred to as neighboring feature points, are filtered out based on dissimilar or mutual exclusive attributes such as differences in color, type, distance, etc. For example: feature point $P_{1,3}$, color may be yellow and does not match feature point $P_{2,1}$ color which may be white, therefore, feature point $P_{1,3}$ is not a match for $P_{2,1}$ and feature point $P_{1,3}$ is filtered out. The Method 400 proceeds to Block 408D.

At Block 408D, feature distances are calculated for the remaining pairs with respect to feature pint $P_{2,1}$. For example: Feature distance pairs: feature distance ($P_{2,1}$, $P_{1,1}$) and feature distance ($P_{2,1}$, $P_{1,2}$) are calculated.

At Block 408E, the pair of feature points above a predetermined feature distance threshold is selected as a feature match, meaning the pair of feature points is the same feature point. For example: suppose feature distance ($P_{2,1}$, $P_{1,1}$) has a larger value than feature distance ($P_{2,1}$, $P_{1,2}$), then feature point $P_{1,1}$, is selected as a feature match for $P_{2,1}$ in Block 408F (assuming a larger value equals to more of a likely match based on a particular feature distance calculation). The Method 400 proceed back to Block 408A and reiterates for every feature point observed by the selected vehicle until all feature point pairs are identified. The Method 400 proceeds to Block 410.

Referring to FIG. 7B, a pair of matched feature points ($P_{1,2}$, $P_{2,1}$) is considered a good match based on local information, such as the color, type, relative positions to other features, etc. However, a locally good feature pair may be an incorrect matched feature point pair from a global perspective. For example, the feature point pair $P_{1,E}$ and $P_{2,E}$ (outlier pair) shown in the boundary region E may be a good match based on color, type, and relative position of the underlying landmark. However, if the outlier pair are used for global alignment, the V1 and V2 trajectories will be incorrectly aligned. Among all the feature pairs, which are locally good matches, outlier feature pairs may contribute to incorrect global registration/alignment. A random sample consensus (RANSAC) based method may be used to detect and remove the outlier feature matches in order to resolve lane line matching issues.

Figure 8B:
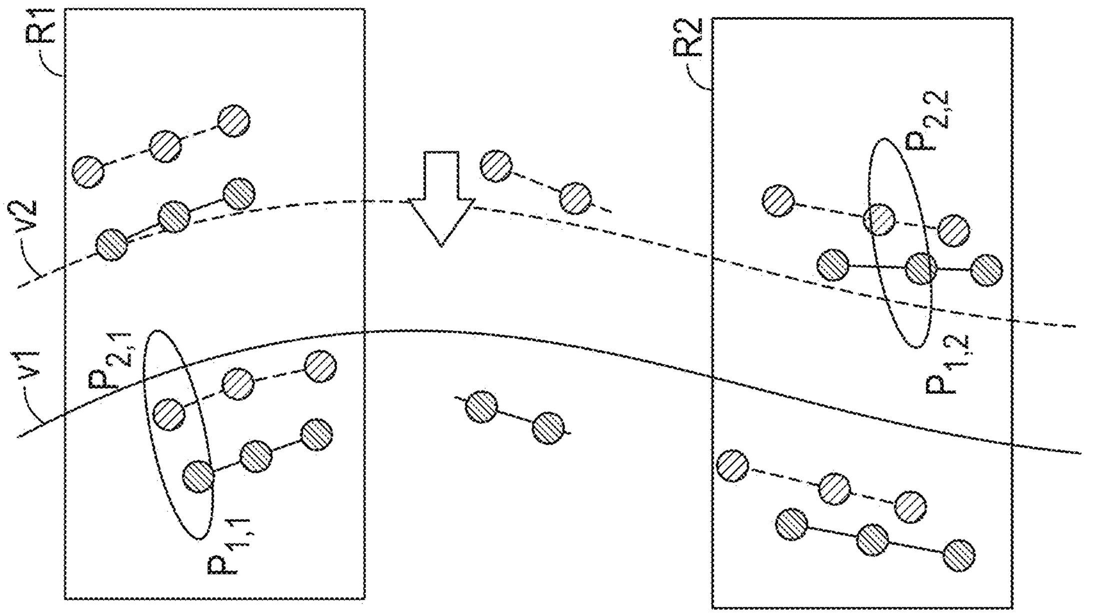
FIG. 8B is another illustration of perception data gathered by the first vehicle and the second vehicle, according to an exemplary embodiment.
Figure 8A:
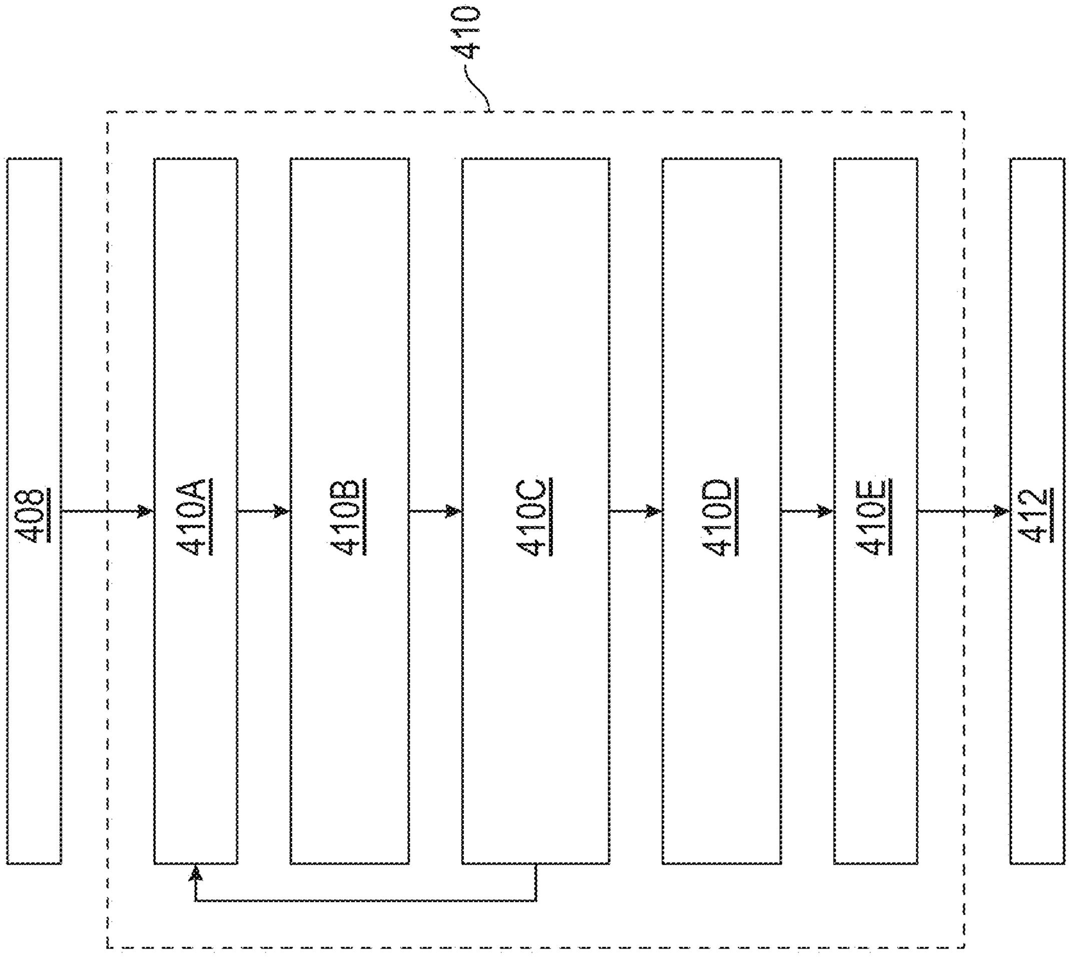
FIG. 8A is a detailed flow diagram of yet another block of FIG. 4, according to an exemplary embodiment.

FIG. 8A is a detailed block flow diagram of Block 410, of a method of detecting and removing outlier feature point matches. The combination of detecting and removing outlier feature point matches is also referred to as filtering or filter outlier feature point matches. The remaining inlier feature point pairs are selected as the final matched feature points.

FIG. 8B is an illustration of the perception data gathered by each of the vehicles 100A, 100B. FIG. 8B is used as an exemplary illustration for describing the detailed block flow diagram of Block 410. FIG. 8 shows the trajectory V1 of the first vehicle 100A, the trajectory V2 of the second vehicle 100B, a first observation region R1 having feature point $P_{1,1}$ observed by the first vehicle and a feature point $P_{2,1}$ observed by the second vehicle, and a second observation region R2 having feature point $P_{1,2}$ observed by the first vehicle and a feature point $P_{2,2}$ observed by the second vehicle. Feature point $P_{1,1}$ and feature point $P_{2,1}$ are determined to be match feature pairs by the block flow diagram of Block 408. Feature point $P_{1,2}$ and feature point $P_{2,2}$ are also determined to be match feature pairs from Block 408.

Referring to FIGS. 8A and 8B, at Block 410A, for each vehicle 100A, 100B, two different observation regions are randomly selected and a matched feature point pair is selected in each randomly selected region. As an example, a first observation region R1 and a second observation R2 are randomly selected, the match feature pair $P_{1,1}$ and $P_{1,2}$ in the first observation region R1 is randomly selected, and the match feature pair as $P_{1,2}$ and $P_{2,2}$ in the second observation region R2 is randomly selected. The Method 400 proceeds to Block 410B.

At Block 410B, the selected two matched feature pairs are aligned by translating the trajectory V2 with respect to the trajectory V1 such that feature point $P_{2,1}$ overlaps with the feature point $P_{1,1}$. The trajectory V1 and V2 graph is fixed at overlapping feature points $P_{1,1}$, $P_{2,1}$ and rotated such that feature point $P_{2,2}$ is rotated to overlap with the point $P_{1,2}$. The translated vector and the rotated angle are recorded. The whole point cloud in the V2 is transformed by applying the above translation vector to all points in the V2 and rotating all the translated feature points about the fixed overlapping feature points $P_{1,1}$, $P_{2,1}$. Feature distance pairs: feature distance ($P_{2,1}$, $P_{1,1}$), feature distance ($P_{2,1}$, $P_{1,2}$). The Method 400 proceeds to 410C.

Figure 9A:
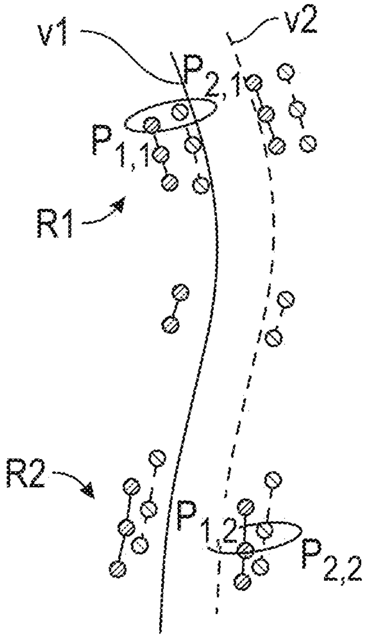
FIG. 9A is an illustration of selected match pairs of feature points, according to an exemplary embodiment.
Figure 9B:
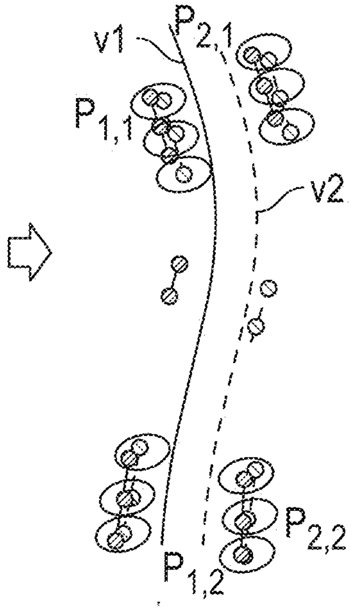
FIG. 9B is an illustration of relatively good match pairs of feature points of FIG. 9A, according to an exemplary embodiment.

As in illustrative example for Block 410B, FIG. 9A shows the match pairs $P_{1,1}$ and $P_{2,1}$ in a first observation region R1 is randomly selected and $P_{1,2}$ and $P_{2,2}$ in a second observation region R2 is randomly selected. FIG. 9B shows the matching feature pairs are translated such that $P_{2,1}$ overlaps with $P_{1,1}$ fixing the overlapping feature points $P_{2,1}$ with $P_{1,1}$ and rotating the trajectories V2 with respect to trajectory V1 until feature point $P_{2,2}$ overlaps feature point $P_{1,2}$. FIG. 9B shows a relatively good global match with 12 inlier match pairs.

Figure 10A:
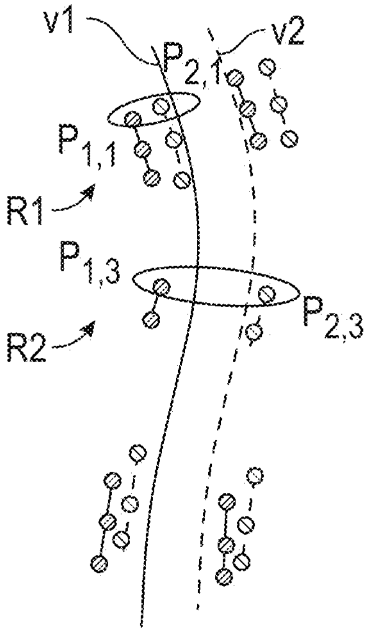
FIG. 10A is an illustration of other selected match pairs of feature points, according to an exemplary embodiment.
Figure 10B:
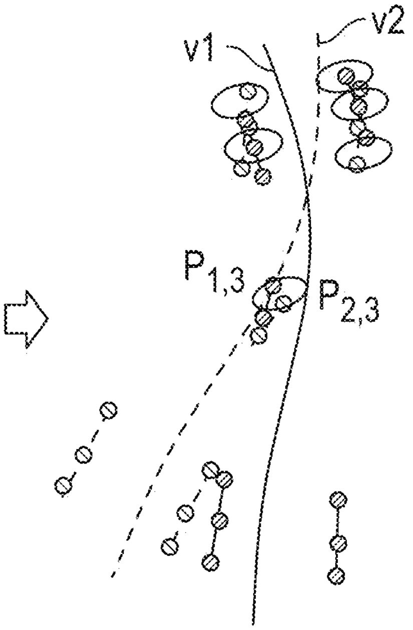
FIG. 10B is an illustration of relatively bad match pairs of feature points of FIG. 10A according to an exemplary embodiment.

FIG. 10A shows the match pairs $P_{1,1}$ and $P_{2,1}$ in the first observation region R1 is randomly selected and $P_{1,3}$ and $P_{2,3}$ in the second observation region R2 is selected. FIG. 10B shows trajectory V2 including the matching feature pairs are translated such that $P_{2,1}$ overlaps with $P_{1,1}$, fixing $P_{2,1}$ with $P_{1,1}$ and rotating the graph until $P_{2,3}$ overlaps with $P_{1,3}$. FIG. 10B shows a relatively bad global match with 7 inlier match pairs and as evidenced by the crossing of trajectory V1 and trajectory V2.

At Block 410C, a solution score is evaluated for each translated vector and rotated angle. The distance of each feature pairs is calculated after transformed and count the number of match feature pairs within a threshold distance, such as 0.2 meters. The transformed GPS distance of each point in the V2 is calculated and obtain the GPS offsets variance. The percentage of the inlier feature pairs in V1 and V2 is calculated separately. The Method 400 proceeds to Block 410D.

At Block 410D, the combined score with highest count number of features within 0.2 meters and lowest GPS offsets variance as a solution is calculated. Normalize the counts number and GPS variance to the range [0, 1], and reverse the GPS variance to ensure the lower values are better. For example, Combined_scores=(count_weight*normalized_count)+(GPS_variance_weight*normalized_variance). The Method 400 proceeds to Block 410E.

At Block 410E, select inlier feature point pairs as the final match feature pairs between the first vehicle and the second vehicle. The Method 400 proceeds to Block 412.

Referring Back to FIG. 4, at Block 412, the feature points are associated between the first vehicle and the second vehicle using the matched feature pairs of the best solution. The Method 400 proceeds to Block 414.

At Block 414, the map data is updated and optimized with the associated data and communicated to at least one smart vehicle. The Method 400 proceeds to Block 416.

At Block 416, the at least one smart vehicle executes a function of the smart system based at least in part on the updated and optimized map data received in Block 414. In a non-limiting example, the smart system of the at least one vehicle may utilize the updated and optimized map to maintain the at least one vehicle in a given lane or at least partially autonomously operate the at least one vehicle.

The description of the present disclosure is merely exemplary in nature and variations that do not depart from the general sense of the present disclosure are intended to be within the scope of the present disclosure. Such variations are not to be regarded as a departure from the spirit and scope of the present disclosure.

What is claimed is:

1. A method of feature matching for associating vehicle perception data collected by a plurality of vehicles, comprising:

receiving perception data from a plurality of vehicles, wherein the plurality of vehicles includes a first vehicle and a second vehicle, and wherein the vehicle perception data is collected at different times and vehicle trajectories;

processing the perception data to identify first feature points observed by the first vehicle and second feature points observed by the second vehicle, respectively, wherein the first feature points and the second feature points represent observations of an overlapping region of an environment;

creating feature descriptors for each of the first feature points and for each of the second feature points;

comparing the feature descriptors for each of the first feature points and for each of the second feature points to determine pairs of matching first feature points and second feature points;

associating the pairs of matching first feature points and second feature points;

updating a map database with the associated pairs of matching first feature points and second feature points; and operating an autonomous vehicle based on the updated map database;

wherein creating feature descriptors for each of the first feature points and for each of the second feature points, includes:

plotting the first feature points on a first bitmap and creating a first feature descriptor for each of the first feature points, and plotting the second feature points on a second bitmap and creating a second feature descriptor for each of the second feature points;

wherein comparing the feature descriptors for each of the first feature points and for each of the second feature points, further includes:

applying a first spatial histogram on at least one of the first feature descriptors and a second spatial histogram at least one of second feature descriptors proximal to the at least one of the first feature descriptors, determining matching first feature descriptors and second feature descriptors based on a predetermined feature distance threshold between the first spatial histogram and the second spatial histogram, and determining pairs of matching first feature points and second feature points based on a matching first descriptor and second feature descriptor; and wherein the first bitmap and the second bitmap include multiple layers, wherein each layer of the first bitmap and second bitmap represent different attributes of the first feature points and the second feature points, respectively.

2. The method of claim 1, wherein at least one of the first bitmap and the second bitmap is a multi-layer bitmap, and wherein each layer includes a different attribute of a feature point.

3. The method of claim 1, wherein determining pairs of matching first feature points and second feature points further includes:

identifying neighboring first feature points and second feature points;

determining non-matching first feature descriptors and second feature descriptors based on mutual exclusive attributes between the first spatial histogram and the second histogram; and filtering out non-matching first feature descriptors.

4. The method of claim 3, wherein filtering out non-matching first feature descriptors is performed before determining pairs of matching first feature points and second feature points based on the matching first descriptor and second feature descriptor.

5. The method of claim 1, further includes:

determining outlier pairs of matching first feature point and second feature points; and filtering out the outlier pairs before associating the pairs of matching first feature points and second feature points.

6. The method of claim 5, wherein determining outlier pairs of matching first feature point and second feature points includes:

identifying a first observation region and a second observation region;

randomly selecting a first pair of matching feature points in the first observation region and a second pair of matching feature points in the second observation region, wherein the first pair of matching feature points includes feature points $P_{1,1}$, $P_{2,1}$ and the second pair of matching feature points includes feature points $P_{1,2}$, $P_{2,2}$;

determining a translated vector by translating $P_{2,1}$ to overlap $P_{1,1}$ and fix overlapping feature points $P_{1,1}$, $P_{2,1}$;

determining a rotated angle by rotating feature points $P_{2,2}$ to overlap $P_{1,2}$ while pivoting on the fixed overlapping feature points $P_{1,1}$, $P_{2,1}$; and applying the translated vector and the rotated angle to the remaining pairs of matching feature points.

7. The method of claim 6, further includes determining a solution score based on a number of feature pair inliers and GPS variance from translation and rotation.

8. The method of claim 1, wherein the method is performed by a controller located in one of: a smart vehicle and a cloud based server.

9. A system for feature matching to associate vehicle perception data, the system comprising:

a server communication system configured to receive perception data from a plurality of vehicles;

a map database;

a server controller in electrical communication with the server communication system and the map database, wherein the server controller is configured to:

receive perception data from a plurality of vehicles, wherein the plurality of vehicles includes a first vehicle and a second vehicle, and wherein the perception data is collected at different times and vehicle trajectories;

process the perception data to identify first feature points observed by the first vehicle and second feature points observed by the second vehicle, respectively, wherein the first feature points and the second feature points represent observations of an overlapping region of an environment;

create feature descriptors for each of the first feature points and for each of the second feature points;

determine pairs of matching first feature points and second feature points includes comparing the feature descriptors for each of the first feature points and for each of the second feature points;

associate the pairs of matching first feature points and second feature points;

update a map database with the associated pairs of matching first feature points and second feature points; and communicate the updated map database to at least one of the plurality of vehicles for operation based on the updated map database;

wherein create feature descriptors for each of the first feature points and for each of the second feature points, includes:

plot the first feature points on a first bitmap and create a first feature descriptor for each of the first feature points, and plot the second feature points on a second bitmap and create a second feature descriptor for each of the second feature points;

wherein at least one of the first bitmap and the second bitmap is a multi-layer bitmap, and wherein each layer includes a different attribute of a feature point; and wherein determine pairs of matching first feature points and second feature points, further includes:

apply a first spatial histogram on at least one of the first feature descriptors and a second spatial histogram at least one of second feature descriptors proximal to the at least one of the first feature descriptors, determine matching pairs of first feature descriptors and second feature descriptors based on a feature distance threshold between the first spatial histogram and the second spatial histogram, and determine matching pairs of first feature points and second feature points based on a matching first descriptor and second feature descriptor.

10. The system of claim 9, wherein determine pairs of matching first feature points and second feature points further includes:

identify neighboring first feature points and second feature points;

determine non-matching first feature descriptors and second feature descriptors based on mutual exclusive attributes between the first spatial histogram and the second spatial histogram; and filter out non-matching first feature descriptors.

11. The system of claim 10, wherein the server controller is configured to:

determine outlier pairs of matching first feature point and second feature points; and filter out the outlier pairs before associating the pairs of matching first feature points and second feature points.

12. The system of claim 11, wherein determining outlier pairs of matching first feature point and second feature points includes:

identify a first observation region and a second observation region;

select a first pair of matching feature points in the first observation region and a second pair of matching feature points in the second observation region, wherein the first pair of matching feature points includes feature points $P_{1,1}$, $P_{2,1}$ and the second pair of matching feature points includes feature points $P_{1,2}$, $P_{2,2}$;

determine a translated vector by translating $P_{2,1}$ to overlap $P_{1,1}$ and fix overlapping feature points $P_{1,1}$, $P_{2,1}$;

determine a rotated angle by rotating feature points $P_{2,2}$ to overlap $P_{1,2}$ while pivoting on the fixed overlapping feature points $P_{1,1}$, $P_{2,1}$; and apply the translated vector and the rotated angle to the remaining pairs of matching feature points.

13. The system of claim 12, wherein the server controller is further configured to:

determine a solution score based on a number of feature pair inliers and GPS variance from translation and rotation.

14. A system comprising a processor and a non-transitory computer readable medium having instructions stored thereon for feature matching to associate vehicle perception data, that upon execution by the processor, cause the processor to:

receive perception data on a portion of a vehicle path gathered by a plurality of vehicles, wherein the perception data is collected at different times and vehicle trajectories;

create feature points for each of the plurality of vehicles by processing the data gathered by each of the plurality of vehicles, respectively, wherein the feature points represent observations of an overlapping region of an environment;

create a feature descriptor for each of the feature points for each of the plurality of vehicles using multi-layer bitmap data structures;

create lane line point associations by matching common feature descriptors and filtering outliers;

update map data with lane point associations;

communicate updated map data to at least one of plurality of vehicles; and wherein determine pairs of matching first feature points and second feature points, further includes:

apply a first spatial histogram on at least one of the first feature descriptors and a second spatial histogram at least one of second feature descriptors proximal to the at least one of the first feature descriptors, determine matching pairs of first feature descriptors and second feature descriptors based on a feature distance threshold between the first spatial histogram and the second spatial histogram, and determine matching pairs of first feature points and second feature points based on a matching first descriptor and second feature descriptor; and wherein the instructions further causes the processor to:

compare a first spatial histogram on at least one of the first feature descriptors and a second spatial histogram on at least one of second feature descriptors, determine matching first feature descriptors and second feature descriptors based on a feature distance threshold between the first spatial histogram and the second spatial histogram, and determine matching first feature points and second feature points based on a matching first descriptor and second feature descriptor.

* * * * *